United States Patent Office 3,264,291
Patented August 2, 1966

3,264,291
7-UREIDOCEPHALOSPORANIC ACID DERIVATIVES
Karl Schenker, Basel, Erwin Friedrich Jenny, Riehen, and Max Wilhelm, Allschwil, Switzerland, assignors to Ciba Corporation, New York, N.Y., a corporation of Delaware
No Drawing. Filed Mar. 18, 1964, Ser. No. 352,965
Claims priority, application Switzerland, Apr. 3, 1963, 4,245/63; Oct. 4, 1963, 12,273/63; Feb. 27, 1964, 2,405/64
12 Claims. (Cl. 260—243)

The present invention relates to the manufacture of new therapeutically active derivatives of 7-amino-cephalosporanic acid of the Formula I

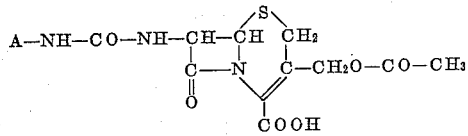

in which A represents an alkyl radical which contains most 6 carbon atoms, and is substituted by a lower alkoxy, halogen-lower alkoxy or halogen-cyclo-alkyl group or more especially by one or more, preferably 1 to 5, halogen atoms and of their salts. The cycloalkyl radical may contain 3 to 8 carbon atoms. A is preferably a straight or branched alkyl radical substituted by one or more halogen atoms and containing 2 or 3 carbon atoms in a straight chain.

Suitable halogen atoms are bromine, iodine, fluorine and more especially chlorine. The halogenalkyl group is, for example, a 2-halogenethyl, 2-halogen-propyl or 1-methyl-2-halogenpropyl group.

The salts of the new compounds are metal salts, primarily those of therapeutically useful alkali metals or alkaline earth metals, such as sodium, potassium or calcium, or salts with tertiary organic nitrogen bases, for example triethylamine or N-ethylpiperidine.

In animal tests in vitro and in vivo, for instance in mice or rats, the new compounds display antibacterial activity towards Gram-positive bacteria, for example *Bacillus subtilis*, *Bacterium megatherium* and *Staphylococcus aureaus*, more especially also towards penicillin-resistant strains, and above all also towards Gram-negative bacteria, for example *Escherichia coli*, *Klibsiella pneumoniae* and *Salmonella typhi murium*. They may therefore be used as medicaments in human and veterinary medicine, and also as additives to animal fodder.

Particularly valuable are the compounds of Formula I in which A represents an alkyl radical substituted by one or more halogen atoms and containing 2 or 3 carbon atoms in a straight chain, for example 7-[N'-(1'-methyl-2'-chloropropyl)-ureido]-cephalosporanic acid and 7-[N'-(β-chlorethyl)-ureido] - cephalosporanic acid and their salts. In vitro their activity is about four times that of 7-(N'-alkyl-ureido)-cephalosporanic acids not substituted by halogen.

The new compounds are manufactured by known methods; they are obtained when isocyanates of the formula A—N=C=O (II)—where A has the above meaning—are reacted with 7-amino-cephalosporanic acid or a salt thereof, more especially a quaternary salt with a strong organic nitrogen base, for example triethylamine. The reaction is performed in the known manner in an inert solvent, preferably in methylene chloride or dimethylformamide.

The new compounds are suitable for use as medicaments, for example in the form of pharmaceutical preparations containing the new compounds in conjunction or admixture with an organic or inorganic solid or liquid pharmaceutical excipient suitable for enteral, local or parenteral administration. Suitable excipients are substances that do not react with the new compounds, for example water, gelatine, lactose, starches, stearyl alcohols, gums, propylene glycol, polyalkylene glycols, white petroleum jelly, cholesterol or other known medicinal excipients. The pharmaceutical preparations may be, for example, tablets, dragees, ointments, creams or capsules, or in liquid form solutions, suspensions or emulsions. They may be sterilised and/or contain assistants, such as preserving, stabilising, wetting or emulsifying agents, solution promoters, salts for regulating the osmotic pressure, or buffers. They may also contain further therapeutically valuable substances. The preparations are formulated by the usual methods.

The following examples illustrate the invention without restricting its scope thereto.

Example 1

544 mg. (=2 millimols) of 7-amino-cephalosporanic acid are dissolved in 10 cc. of methylene chloride and 0.56 cc. (=4 millimols) of triethylamine, 275 mg. (=2.06 millimols) of 1-methyl-2-chloropropylisocyanate are added, and the whole is heated for 8 hours at 50° C. with exclusion of moisture and then evaporated to dryness under vacuum; the residue is dissolved in 50 cc., of chloroform and agitated with 20 cc. of water and 3 cc. of 2 N-hydrochloric acid. The chloroform solution is once more washed with 10 cc. of water, then dried over anhydrous sodium sulfate and evaporated under a waterjet vacuum. On recrystallisation of the residue from ethyl acetate+ether+petroleum ether, 7 - [N' - (1' - methyl-2'-chloropropyl)-ureido]-cephalosporanic acid of the formula

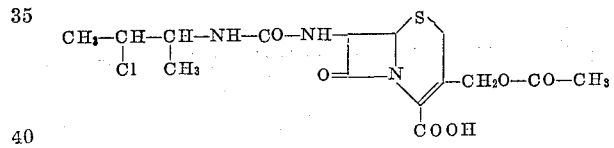

is obtained in colorless crystals melting at 158° C. with decomposition.

The sodium salt of this acid is prepared in the following manner:

The acid is dissolved in acetone and an acetonic solution of 50% strength of sodium ethylhexanoate is added. The bulk of acetone is evaporated and the residual syrup is mixed with ether+petroleum ether (1:1). A crystal powder of faintly beige color is obtained; it melts at 160° C. with frothing.

Example 2

A mixture of 544 mg. (=2 millimols) of 7-amino-cephalosporanic acid, 10 cc. of methylene chloride, 0.56 cc. of triethylamine and 222 mg. (=2.1 millimols) of β-chlorethylisocyanate is boiled for 8 hours under a slight reflux. The batch is evaporated and the residue is taken up in 50 cc. of chloroform and 50 cc. of ethyl acetate and agitated with 3 cc. of 2 N-hydrochloric acid and 20 cc. of water. The chloroform+ethyl acetate solution is then once more agitated with 10 cc. of water, dried over sodium sulfate and evaporated under mild conditions. On recrystallisation of the residue from acetone+acetic acid+petroleum ether, 7 - [N' - (β-chlorethyl) - ureido]-cephalosporanic acid of the formula

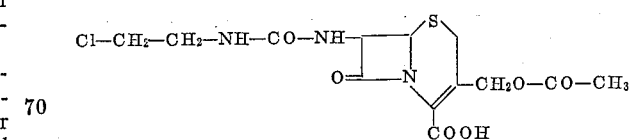

is obtained in substantially colorless crystals melting at 165° C. with decomposition.

The sodium salt is prepared with sodium ethylhexanoate in acetone; it becomes colored at 170° C. and decomposes above 200° C.

Example 3

When 7-amino-cephalosporanic acid is reacted with γ-chloropropylisocyanate as described in Example 1 or 2, 7-[N'-(γ-chloropropyl)-ureido]-cephalosporanic acid is obtained; it melts at 160° C. with decomposition. Its sodium salt melts at 220° C. with decomposition.

Example 4

When 7-amino-cephalosporanic acid is reacted with 2-chloropropylisocyanate as described in Example 1 or 2, 7-[N'-(2'-chloropropyl)-ureido]-cephalosporanic acid of the formula

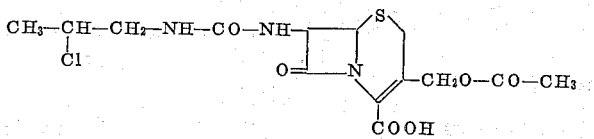

is obtained which melts at 110–113° C. with decomposition. Its sodium salt melts at 195° C. with decomposition.

Example 5

By reacting 7-amino-cephalosporanic acid with 1:1-dimethyl-2-chlorethyl isocyanate by the method described in Example 1 or 2 7-[N'-(1':1'-dimethyl-2'-chlorethyl)-ureido]-cephalosporanic acid of the formula

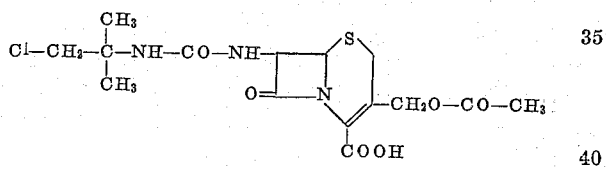

melting at 90° C. with foaming is obtained. The sodium salt also melts with foaming at 110° C.

Example 6

By reacting 2:3-dichloropropyl isocyanate with 7-amino-cephalosporanic acid by the method described in Example 1 or 2 7-[N'-(2':3'-dichloropropyl)-ureido]-cephalosporanic acid of the formula

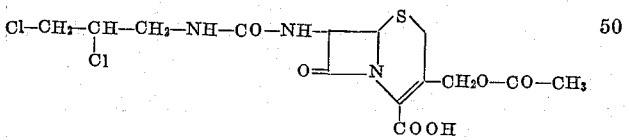

is obtained whose crystalline sodium salt melts at 150° C.

Example 7

544 mg. (2 millimols) of 7-amino-cephalosporanic acid in 10 ml. of methylene chloride and 0.56 ml. of triethylamine are gently refluxed with 193 mg. (2.1 millimols) of chloromethyl-isocyanate for 2 hours. The reaction mixture is evaporated under mild conditions at a water-jet vacuum and the residue is recrystallized from a mixture of acetone and ether to yield the triethylammonium salt of 7-(N'-chlormethylureido)-cephalosporanic acid melting at 160° C. (with decomposition). The salt is readily soluble in water.

Example 8

707 mg. of 7-amino-cephalosporanic acid are dissolved in 8 ml. of methylene chloride and 0.725 ml. of triethylamine and, after the addition of 503 mg. of 2:2:3:3:3-pentafluoropropyl-isocyanate at 0° C., the whole is heated at 50° C. with the exclusion of moisture.

The reaction mixture is then evaporated to dryness in vacuo and the residue dissolved in a little acetone. After a short time the triethylammonium salt of 7-(N'-2':2':3':3':3'-pentafluoropropyl-ureido)-cephalosporanic acid of the formula

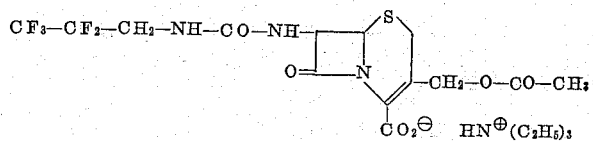

crystallizes out in the form of colorless crystals melting at 150° C. (with decomposition).

Example 9

550 mg. of 7-amino-cephalosporanic acid are dissolved in 5.0 ml. of methylene chloride and 0.566 ml. of triethylamine, and 225 mg. of β-fluoroethyl isocyanate are then added at 0° C. and the whole heated for 1 hour at 50° C. The reaction mixture is evaporated to dryness in vacuo and the residue dissolved in a little acetone. After a short time the triethylammonium salt of 7-(N'-β-fluorethylureido)-cephalosporanic acid of the formula

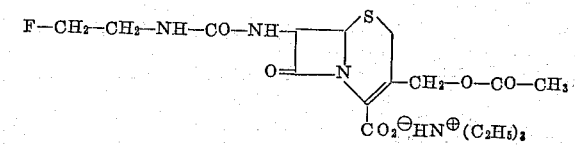

crystallizes out in the form of colorless crystals melting at 139° C. (with decomposition).

Example 10

530.0 mg. of 7-amino-cephalosporanic acid are dissolved in 5.0 ml. of methylene chloride and 0.545 ml. of triethylamine; 357 mg. of 2:2:3:3-tetrafluorocyclobutyl-methylisocyanate in 5.0 ml. of methylene chloride are then added at 0° C. and the batch is heated for 1 hour at 50° C. with the exclusion of moisture. The reaction mixture is then evaporated to dryness in vacuo, the triethylammonium salt of 7-(N'-2':2':3':3'-tetrafluorocyclobutyl-methylureido)-cephalosporanic acid of the formula

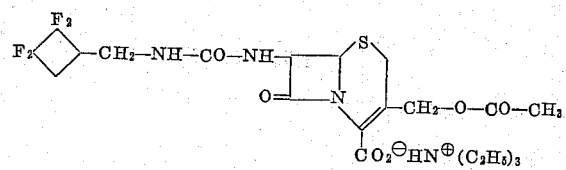

precipitating in the form of a dry foam.

The isocyanate used as starting material may be prepared as follows:

10 grams of 2:2:3:3-tetrafluorocyclobutyl-methylamine in absolute ethyl acetate are converted with hydrogen chloride into 12:3 grams of crystalline hydrochloride. The latter is suspended in 50 ml. of trichlorobenzene and 50 ml. of sulpholan. Phosgene is introduced at 80–100° C. until the hydrochloride has disappeared. Phosgene is then blown through the reaction mixture for 3 hours at 140° C. which is then distilled under normal pressure. 12.0 grams of a colorless oil distill at a boiling temperature of 170–180° C. The distillate is subsequently fractionated to yield 6.8 grams of 2:2:3:3-tetrafluorocyclobutyl-methylisocyanate as a colorless liquid boiling at 154–159° C.

Example 11

544 mg. (2 millimols) of 7-amino-cephalosporanic acid in 10 ml. of methylene chloride and 0.56 ml. of triethylamine are gently refluxed with 314 mg. (2.1 millimols) of α-n-butoxy-ethylisocyanate for 2 hours. The batch is evaporated under mild conditions in a water-jet vacuum and the residue recrystallized from a mixture of acetone and ether to yield directly the triethylammonium salt of 7-[N'-(α-n-butoxyethyl)-ureido]-cephalosporanic acid of the formula

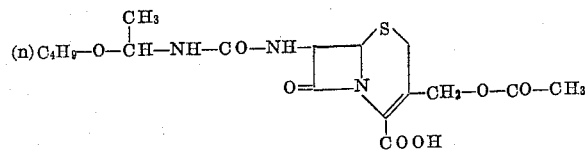

melting at 170° C. (with decomposition). The salt is readily soluble in water.

*Example 12*

In an analogous manner to that described in Example 11, the triethylammonium salt of 7-[N'-(α-ethoxyethyl)-ureido]-cephalosporanic acid of the formula

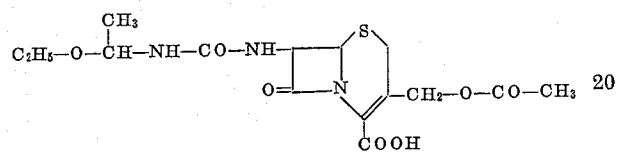

is obtained by reacting 7-amino-cephalosporanic acid with α-ethoxy-ethylisocyanate.

The amorphous salt is dissolved in a little acetone and converted by means of sodium ethylhexanoate (dissolved in acetone) directly into the sodium salt which crystallizes out on the addition of petroleum ether and has a melting point of 270° C. (with decomposition).

*Example 13*

When 7-amino-cephalosporanic acid is reacted with α-(β'-chlorethoxy)-ethylisocyanate by the method described in Example 11, there is obtained the triethylammonium salt of 7-{N'[α-(β'-chlorethoxy)-ethyl]-ureido}-cephalosporanic acid of the formula

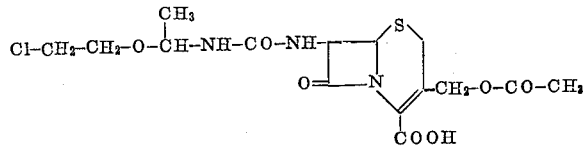

which can be converted by treatment with acetonic sodium hexanoate directly into the water-soluble sodium salt melting at 300° C. (with decomposition).

What is claimed is:

1. A compound of the Formula I

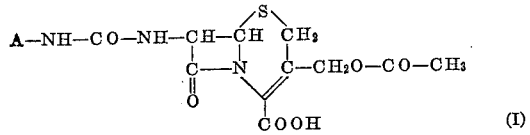

in which A represents an alkyl radical which contains at most 6 carbon atoms, and is substituted by a member selected from the group consisting of a lower alkoxy, a halogen-lower alkoxy a halogen-cycloalkyl group in which cycloalkyl has 3 to 8 ring carbon atoms and one or more halogen atoms.

2. A compound of the Formula I

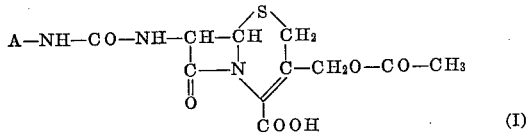

in which A represents an alkyl radical which contains at most 6 carbon atoms 2 to 3 carbon atoms being in a straight chain and is substituted by one to five halogen atoms.

3. A compound of the Formula I

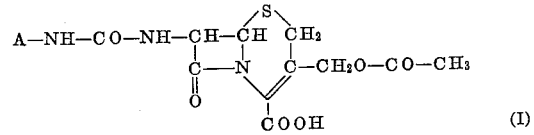

in which A represents a straight or branched alkyl radical which contains at most 6 carbon atoms 2 to 3 carbon atoms being in a straight chain and is substituted by one to five chlorine atoms.

4. A member selected from the group consisting of 7-[N'-(1'-methyl-2'-chloropropyl)-ureido] - cephalosporanic acid and a non-toxic salt thereof.

5. A member selected from the group consisting of 7-[N'-(β-chlorethyl)-ureido]-cephalosporanic acid and a non-toxic salt thereof.

6. A member selected from the group consisting of 7-[N'-(γ-chloropropyl)-ureido]-cephalsoporanic acid and a non-toxic salt thereof.

7. A member selected from the group consisting of 7-[N'-(2'-chloropropyl) - ureido]-cephalosporanic acid and a non-toxic salt thereof.

8. A member selected from the group consisting of 7-[N'-(1':1'-dimethyl-2'-chlorethyl)-ureido] - cephalosporanic acid and a non-toxic salt thereof.

9. A member selected from the group consisting of 7-[N'-2':3'-dichloropropyl) - ureido] - cephalosporanic acid and an non-toxic salt thereof.

10. A non-toxic salt of the compound claimed in claim 1.

11. A non-toxic salt of the compound claimed in claim 2.

12. A non-toxic salt of the compound claimed in claim 3.

References Cited by the Examiner

UNITED STATES PATENTS 3,173,916  3/1965  Shull et al. ——————— 260—243

ALEX MAZEL, *Primary Examiner.*

JAMES W. ADAMS, JR., *Assistant Examiner.*